US007315712B2

(12) United States Patent
Ito

(10) Patent No.: US 7,315,712 B2
(45) Date of Patent: Jan. 1, 2008

(54) ELECTROPHOTOGRAPHIC IMAGE RECORDING APPARATUS AND METHOD THEREFORE

(75) Inventor: Nobuyuki Ito, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 617 days.

(21) Appl. No.: 10/878,049

(22) Filed: Jun. 29, 2004

(65) Prior Publication Data

US 2005/0019681 A1 Jan. 27, 2005

(30) Foreign Application Priority Data

Jul. 23, 2003 (JP) ............................. 2003-200421

(51) Int. Cl.
*G03G 15/18* (2006.01)
(52) U.S. Cl. .................... 399/154; 399/223; 399/51
(58) Field of Classification Search ................ 399/39, 399/51, 154, 223; 430/45, 107.1
See application file for complete search history.

(56) References Cited

U.S. PATENT DOCUMENTS

| 6,013,403 | A | 1/2000 | Ichikawa ...................... 430/97 |
| 6,327,450 | B1 | 12/2001 | Ito .............................. 399/227 |
| 6,498,910 | B2 | 12/2002 | Haneda ........................ 399/51 |
| 2004/0096232 | A1 | 5/2004 | Ito et al. ....................... 399/49 |

FOREIGN PATENT DOCUMENTS

| EP | 0 401 023 A2 | 12/1990 |
| EP | 1 376 255 A2 | 1/2004 |
| JP | 58-39468 | 3/1983 |
| JP | 11-84764 | 3/1999 |
| JP | 2000-231279 | 8/2000 |
| JP | 2000-305339 | 11/2000 |
| JP | 2000-347476 | 12/2000 |
| JP | 2001-290319 | 10/2001 |

OTHER PUBLICATIONS

Patent Abstracts of Japan, Publication No. 2000-347476, Dec. 15, 2000.
Patent Abstracts of Japan, Publication No. 2001-290319, Oct. 19, 2001.

*Primary Examiner*—David M. Gray
*Assistant Examiner*—Ryan D. Walsh
(74) *Attorney, Agent, or Firm*—Fitzpatrick, Cella, Harper & Scinto

(57) ABSTRACT

In an electrophotographic image recording apparatus apparatus including a photoconductive image bearing member, a charging apparatus for uniformly charging the image bearing member, an exposure apparatus for effecting an image-wise exposure on a surface of the image bearing member after charging thereby forming an electrostatic latent image, a development apparatus for adhering a toner onto the electrostatic latent image thereby forming a toner image, and a transfer member for transferring the formed toner image onto a final support member such as plain paper, in case of forming an image with a hyperchromic toner and a hypochromic toner of a substantially same hue, image formation is executed with a writing resolution for the hypochromic toner larger than a writing resolution for the hyperchromic toner. Thus drawbacks of streak generation by a screen used for the hypochromic toner and a difficulty in obtaining a photographic texture can be resolved.

6 Claims, 9 Drawing Sheets

FIG. 8

$$\begin{pmatrix} R_o \\ G_o \\ B_o \end{pmatrix} = \begin{pmatrix} a11 & a12 & a13 \\ a21 & a22 & a23 \\ a31 & a32 & a33 \end{pmatrix} \begin{pmatrix} R_i \\ G_i \\ B_i \end{pmatrix} \quad \cdots\cdots\cdots (3)$$

$R_o, G_o, B_o$    OUTPUT IMAGE SIGNAL
$R_i, G_i, B_i$     INPUT IMAGE SIGNAL

ELECTROPHOTOGRAPHIC IMAGE RECORDING APPARATUS AND METHOD THEREFORE

This application claims priority from Japanese Patent Application No. 2003-200421 filed Jul. 23, 2003, which is hereby incorporated by reference.

BACKGROUND OF THE INVENTION

1. Field of the Invention

The present invention relates to an image forming apparatus for color image formation by an electrophotographic method, such as a copying apparatus, a printer or a facsimile apparatus, and a method for use therein.

2. Description of Related Art

As an image forming apparatus for forming a color image, there is commercialized an apparatus capable of forming a color image for example by transferring, on a transfer material such as paper supported on a transfer drum (or transfer film), in succession toner images of respective colors formed on a photosensitive drum serving as an image bearing member.

In such image forming apparatus, an electrostatic latent image formed on the photosensitive drum in response to an input image signal is developed with toner of a first color (for example cyan color) to form a toner image, which is transferred onto a transfer material such as paper supported on a transfer drum (transfer film). This transfer step is executed similarly for the toners of three other colors, namely magenta, yellow and black, and a color image can be obtained by superposed transfers of the toner images of four colors in succession on the transfer material.

In an image forming apparatus of electrophotographic type utilizing a recent digital image signal, the latent image is formed by an assembly of dots of a predetermined potential on the surface of a latent image bearing member, or so-called photosensitive member, and a solid image area, a halftone area and a line image area are represented by a change in the density of the dots. In such method, however, it is difficult to deposit the toner particles faithfully on the dot and the toner particles tend to overflow from the dot, thereby leading to a drawback that the gradation of the toner image cannot be obtained corresponding to the ratio of the dot density in a black image area and a white image area in the digital latent image. Also in case the resolution is increased by reducing the dot size for the purpose of improving the image quality, the latent image formed by such small dots becomes more difficult to reproduce, thus often resulting in an image with insufficient sharpness, poor in resolution and in gradation particularly in a highlight area. Also an irregular deviation of the dots gives an impression of granularity, thus constituting a factor leading to a deterioration of the image quality in the highlight area.

Such irregularity, not existent in ink jet recording technology or printing technology, is considered as a major drawback in that it is an unpredictable instability factor in the image quality and is a low-frequency noise macroscopically generated by a random distribution of small toner particles of a size of 5 to 10 μm along the dot contour. Observation of an electrophotographic image under a magnifier reveals that a dot in the electrophotography does not have a smooth contour as in an ink jet recorded image but is formed by a random distribution of small toner particles of a size of 5 to 10 μm along the dot contour. Also the dots fluctuate in the density and in the dot size, and are not circular but distorted in shape, so that none of them looks alike. These parameters show almost random fluctuation, with a considerable low-frequency component, which leads to a noise perceivable to the human eyes.

Such noise is made more conspicuous by a difference between the toner density and the density of the paper. Particularly in comparison for example with an ink jet recorded image, there is a significant influence of an optical dot grain resulting from distribution of numberless small toner particles.

A main cause of the aforementioned phenomena lies in a fact that the electrophotography utilizes small toner particles for forming a dot. There are also various associate factors, including an unsharpening of dot data in the steps of latent image formation, image development and image transfer in the electrophotographic process, an irregular toner scattering resulting from physical properties (electrical resistance and surface roughness) of the copying paper, and a phenomenon, to be explained in the following, caused by an adhesion force in the development process.

While a strong adhesion force (mainly a mirror force of the toner to a developer carrying member) is exerted between the toner and a developing sleeve in case of a one-component developer or between the toner and a carrier in case of a two-component developer, the distribution of the charge amount on the toner is not uniform. Therefore, when the toner is peeled off by a developing bias and is made to fly toward the photosensitive drum, the image formation takes place in an unstable manner as the toner flies more easily in a certain location while more difficultly in another location, thus resulting in an unevenness in the dot formation.

On the other hand, in the ink jet system, a hyperchromic-hypochromic ink process as disclosed in Japanese Patent Application Laid-Open No. S58-39468 does not encounter the aforementioned drawbacks in the electrophotographic process, since the ink jet system itself is simple and since the exclusive paper supporting the current high ink jet image quality has an excellent ability.

Therefore, with respect to the improvement of granularity which is an effect of hyperchromic-hypochromic inks employed for example in the ink jet system, it is found that the hypochromic toner is far more effective in the electrophotography than in the ink jet process, particularly on the apparent low-frequency noise resulting from the aforementioned phenomena of "fluctuation in the toner density forming the dot", "fluctuation in the dot area" and "fluctuation in the dot shape" in the electrophography.

In addition, it is found that the introduction of the hypochromic toner into the electrophotography brings about a revolutionary improvement based on a fact that the optical dot gain which is not a problem in the ink jet system constitutes a significant obstacle in attaining a high image quality in the electrophotography utilizing numberless small toner particles.

For attaining these improvements, there have been proposed methods of forming an image by using a pale-colored toner (hypochromic-toner) in a highlight area and a dense-colored toner (hyperchromic toner) in a solid image area. Japanese Patent Application Laid-Open Nos. H11-84764 and 2000-305339 propose image forming method by combining plural toners of respectively different densities. Japanese Patent Application Laid-Open No. 2000-347476 proposes an image forming apparatus utilizing a combination of a hyperchromic toner and a hypochromic toner, having a maximum reflective density equal to or less than a half of the maximum reflective density of the hyperchromic toner. Japanese Patent Application Laid-Open No. 2000-231279 proposes an image forming apparatus utilizing a combination of a hyperchromic toner, having an image density of 1.0 or higher at a toner amount of 0.5 mg/cm² on the transfer material, and a hypochromic toner having an image density less than 1.0. Also Japanese Patent Application Laid-Open No. 2001-290319 proposes an image forming apparatus utilizing a combination of a hyperchromic toner and a hypochromic toner, having an inclination ratio of recording density within a-range of 0.2 to 0.5.

A high-resolution binary recording of a high level, stably realizable in the ink jet recording process relying on an exclusive paper, cannot be realized on a plain paper which is principally utilized in the electrophotographic apparatus. For this reason, density gradation has been improved for example by utilizing a low-resolution screen as employed in the printing technology. Though the use of a hypochromic toner in a low density area achieves an improvement in coarse and granular impression specific to the electrophotography, it is found, in designing a system particularly intended for photographic image quality, that an image giving emphasis on the smoothness of the highlight area is often selected as an image for using hyperchromic and hypochromic toners, and, in such case, streaks caused by a screen used for the hypochromic toner are very easily noticeable and a photographic texture is difficult to attain. Also in the high density side, an output condition requiring a high resolution is usually selected because such side is often used for the output of characters, but, in a photograph or the like usually selected as an image for using hyperchromic and hypochromic toners, the output image desired for the high density area does not necessitate such a high resolution as required in the character image but factors such as gradation levels, density difference and color difference are more important, and the image output is more stabilized in fact with a screen of a lower line numbers.

SUMMARY OF THE INVENTION

The present invention has been made in order to resolve the aforementioned drawbacks, and is to solve drawbacks of streak formation or difficulty in obtaining photographic texture, associated with the screen used for the hypochromic toner.

An object of the present invention is to provide an electrophotographic image recording apparatus for forming an image with a plurality of toners including a hyperchromic toner and a hypochromic toner of a substantially same hue, the apparatus including:

a photoconductive image bearing member;

charging means which uniformly charges the image bearing member;

exposure means which effects an imagewise exposure on a surface of the image bearing member after charging thereby forming an electrostatic latent image;

development means which adheres a toner onto the electrostatic latent image thereby forming a toner image; and transfer means which transfers the formed toner image onto a transfer material;

wherein a writing resolution for an image for the hypochromic toner is larger than a writing resolution for an image for the hyperchromic toner.

Another object of the present invention is to provide an electrophotographic image recording apparatus for forming an image with a plurality of toners including a hyperchromic toner and a hypochromic toner of a substantially same hue, the apparatus including:

a photoconductive image bearing member;

a charging device adapted for uniformly charging the image bearing member;

an exposure device adapted for effecting an imagewise exposure on a surface of the image bearing member after charging thereby forming an electrostatic latent image;

a development device adapted for adhering a toner onto the electrostatic latent image thereby forming a toner image; and a transfer device adapted for transferring the formed toner image onto a transfer material;

wherein a writing resolution for an image for the hypochromic toner is larger than a writing resolution for an image for the hyperchromic toner.

Still another object of the present invention is to provide an electrophotographic image recording. method for forming an image with a plurality of toners including a hyperchromic toner and a hypochromic toner of a substantially same hue, the method including steps of:

uniformly charging a photoconductive image bearing member;

effecting an imagewise exposure on a surface of the image bearing member after charging thereby forming an electrostatic latent image;

adhering a toner onto the electrostatic latent image thereby forming a toner image and transferring the formed toner image onto a transfer material;

wherein a writing resolution for an image for the hypochromic toner is larger than a writing resolution for an image for the hyperchromic toner.

Still other objects, configurations and effects of the present invention will become fully apparent from the following detailed description which is to be taken in conjunction with accompanying drawings.

BRIEF DESCRIPTION OF THE DRAWINGS

FIG. 8 is a view showing a matrix for transforming a color space of an image signal into a standard color space;

DETAILED DESCRIPTION OF THE PREFERRED EMBODIMENTS

Figure 1:
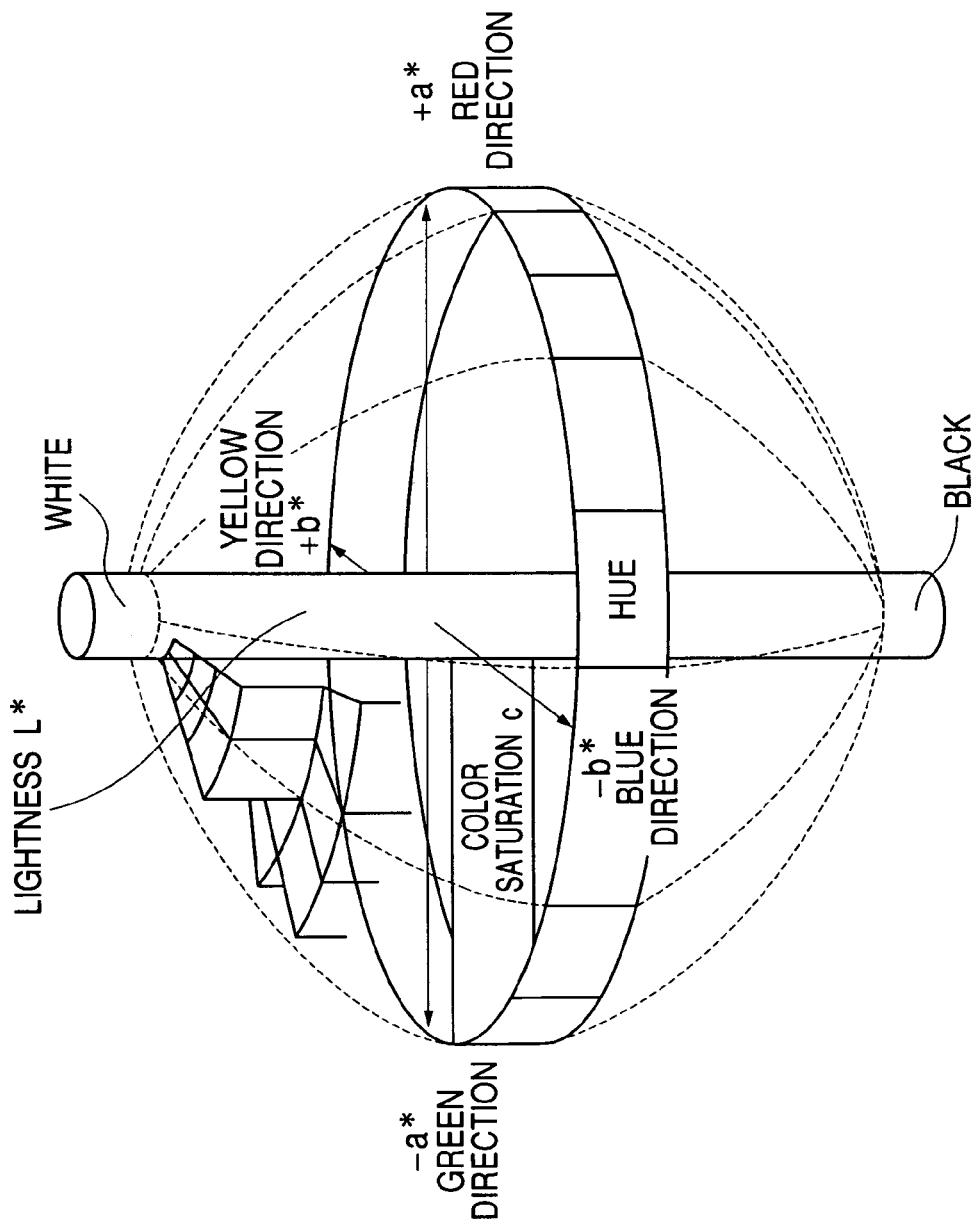
FIG. 1 is a schematic view of a color solid of a L*a*b* color representation system employed in the present invention.

In the present embodiment, L* means a value generally employed in a L*a*b* color representation system and is effective in representing a color by numeric values. A three-dimensional concept of such system is schematically shown in FIG. 1. Referring to FIG. 1, a* and b* in horizontal axes represent a hue in combination. The hue means a scaled value of colors such as red, yellow, green, blue, purple etc. L* in a vertical axis indicates lightness, indicating a level of brightness of a color to be compared, regardless of the hue. Also a* and b* respectively indicate directions of color, and a* indicates a red-green direction while b* indicates a yellow-blue direction.

Figure 2:
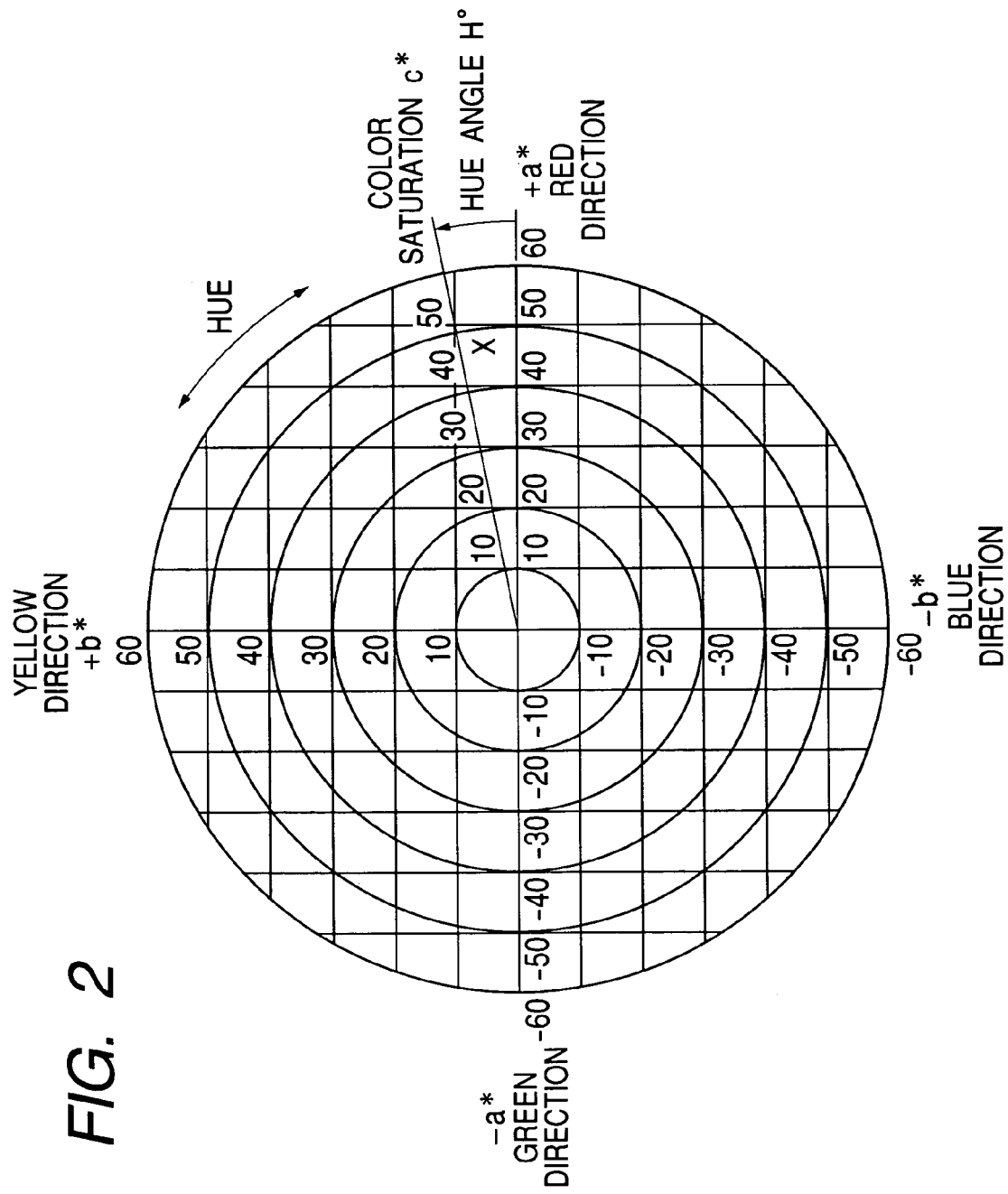
FIG. 2 is a schematic planar view of hue, saturation and hue angle employed in the present invention.

FIG. 2 is a planar conceptual view showing a relationship between hue and saturation at a certain lightness. Also c* means a saturation, determined by a following equation (2) and indicating a level of color clarity:

$$c^* = \sqrt{(a^{*2} + b^{*2})} \qquad (2)$$

Also a hue angle H indicates, for example for a color positioned at a point x(a*, b*) on an a*–b* coordinate system, an angle which a line segment connecting the original point and the point x(a*, b*) forms to a positive direction of the a* axis in the counterclockwise direction therefrom. The hue angle can easily represent a specified hue independently from the lightness.

Figure 3:
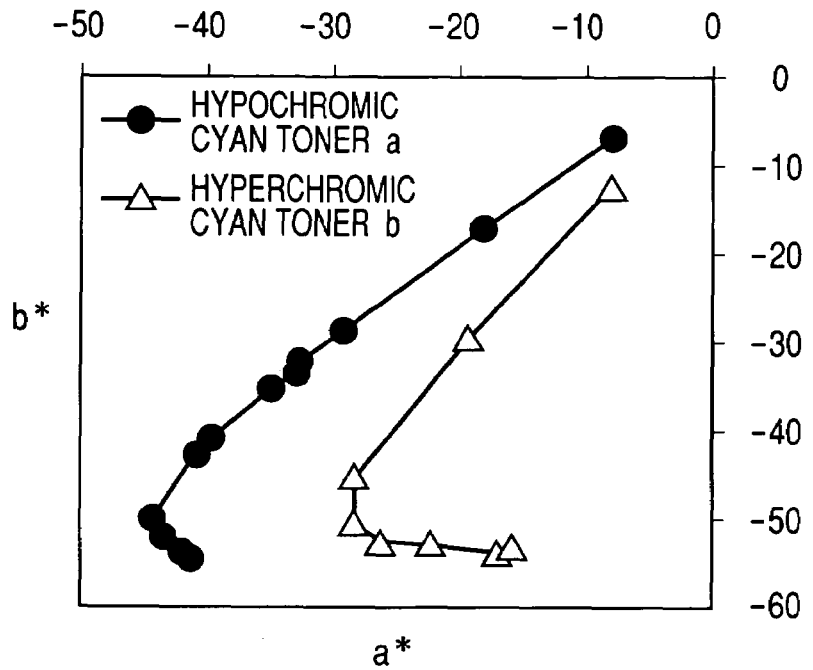
FIG. 3 is a chart showing an example of a hue curve of toner to be employed in the present invention.
Figure 4:
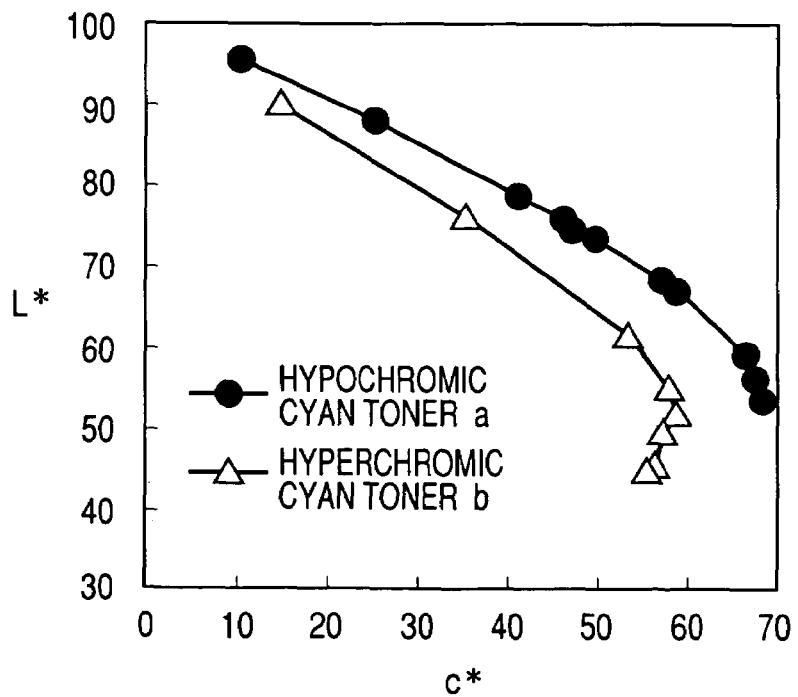
FIG. 4 is a chart showing an example of a saturation-lightness curve of a toner of the present invention.

The a*, b*, c* and L* values of a cyan toner can be determined for example in the following manner. The toner is charged in a commercially available plain-paper full-color copying apparatus (color laser copying apparatus CLC1150; manufactured by Canon Inc.), and, with a plain paper (color laser copier paper TKCLA4; manufactured by Canon Inc.) as an image receiving material, an image of 200 lpi and 16 gradation levels is formed by changing the toner amount on the paper. The a*, b*, c* and L* values of the obtained image are measured with SpectroScan Transmission (manufactured by GretagMacbeth Inc.). There were employed conditions of an observing light source: D50, an observation field: 2°, a density: DIN NB, a white reference: Pap, and a filter: No. The obtained a* and b* values are respectively plotted on the abscissa and the ordinate to obtain an a*–b* coordinate chart, on which a* values at b* of −20 and −30 are determined. A representative result of measurement is shown in FIG. 3. Also the c* value is determined from the foregoing equation (2), and the c* and L* values are respectively plotted on the abscissa and the ordinate to obtain an L*–c* coordinate chart, on which L* value at c* of 30 is determined. A representative result of measurement is shown in FIG. 4.

According to Japanese Patent Application Laid-Open No. 2002-144250 previously applied for by the present applicant, it is possible to resolve the aforementioned drawbacks and to obtain an image without granularity and with an excellent gradation and a wide color reproduction range from a low density area to a high density area, by employing a hypochromic cyan toner having an a* value (a–1) within a range from −19 to −30 at a b* value of −20 and an a* value (a–2) within a range from −29 to −45 at a b* value of −30, and a hyperchromic cyan toner having an a* value (a–3) within a range from −7 to −18 at a b* value of −20 and an a* value (a–4) within a range from −10 to −28 at a b* value of −30.

Figure 5:
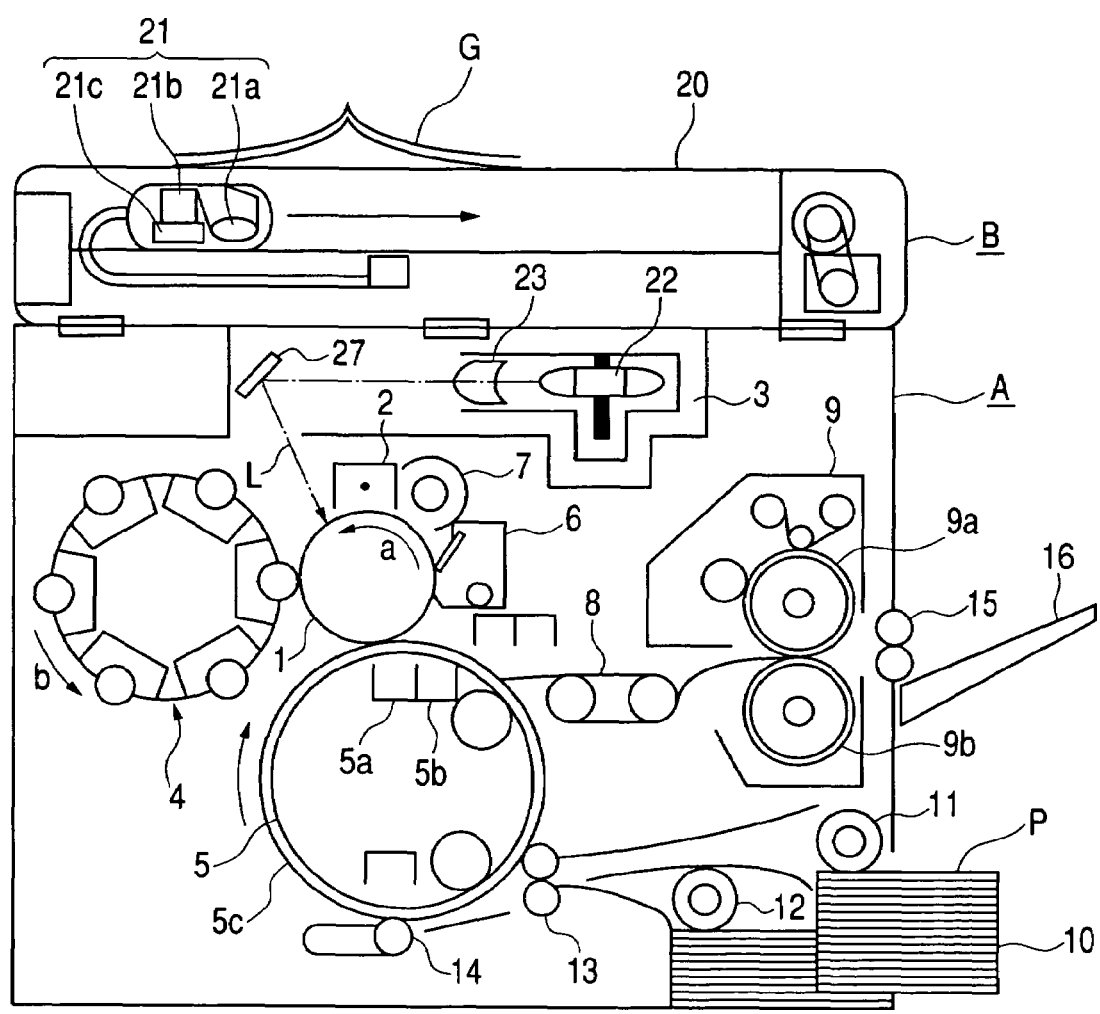
FIG. 5 is a longitudinal cross-sectional view showing configuration of a laser beam copying apparatus (usable also as a printer) for full color image formation, utilizing a hypochromic cyan toner, a hyperchromic cyan toner, a hypochromic magenta toner, a hyperchromic magenta toner, a yellow toner and a black toner.

For the purpose of a color output test with 4 colors with 2 colors, a modified apparatus of a configuration shown in FIG. 5 was prepared, based on the aforementioned color laser copying apparatus CLC1150 (manufactured by Canon Inc.). In FIG. 5, there are provided a printer portion A, and an image reading portion (image scanner) mounted on the printer portion A.

In the image reading portion B, there is provided a fixed original supporting glass 20, on which an original G is placed with a surface to be copied downward and is set by an unillustrated original pressure plate placed thereon. An original reading unit 21 is constituted of an original illuminating lamp 21a, a short-focus lens array 21b, a CCD sensor 21c etc.

In response to depression of an unillustrated copy button, the image reading unit 21 is driven forward under and along the original supporting glass 20, from a home position at the left side thereof to the right side and reversed upon arrival at a predetermined end point of reciprocating motion to the starting home position.

During the forward motion of the image reading unit 21, the downward image surface of the original G set on the original supporting glass 20 is illuminated and scanned in succession from the left hand side to the right hand side, and the scanning illuminating light reflected from the original surface enters and is focused on the CCD sensor 21c through the short-focus lens array 21b.

The CCD sensor 21c is constituted of a light receiving portion, a transfer portion and an output portion which are not illustrated, and in which a light signal is converted in the light receiving portion into a charge signal and transferred in the transfer portion in succession and in synchronization with clock pulses to the output portion, which converts the charge signal into a voltage signal for output after amplification and conversion to a low impedance. An analog signal thus obtained is converted by a known image processing into a digital signal for output to the printer portion A. In this manner the image information of the original G is photo-electrically read by the image reading portion B as time-sequential electrical digital pixel signal (image signal).

Figure 7:
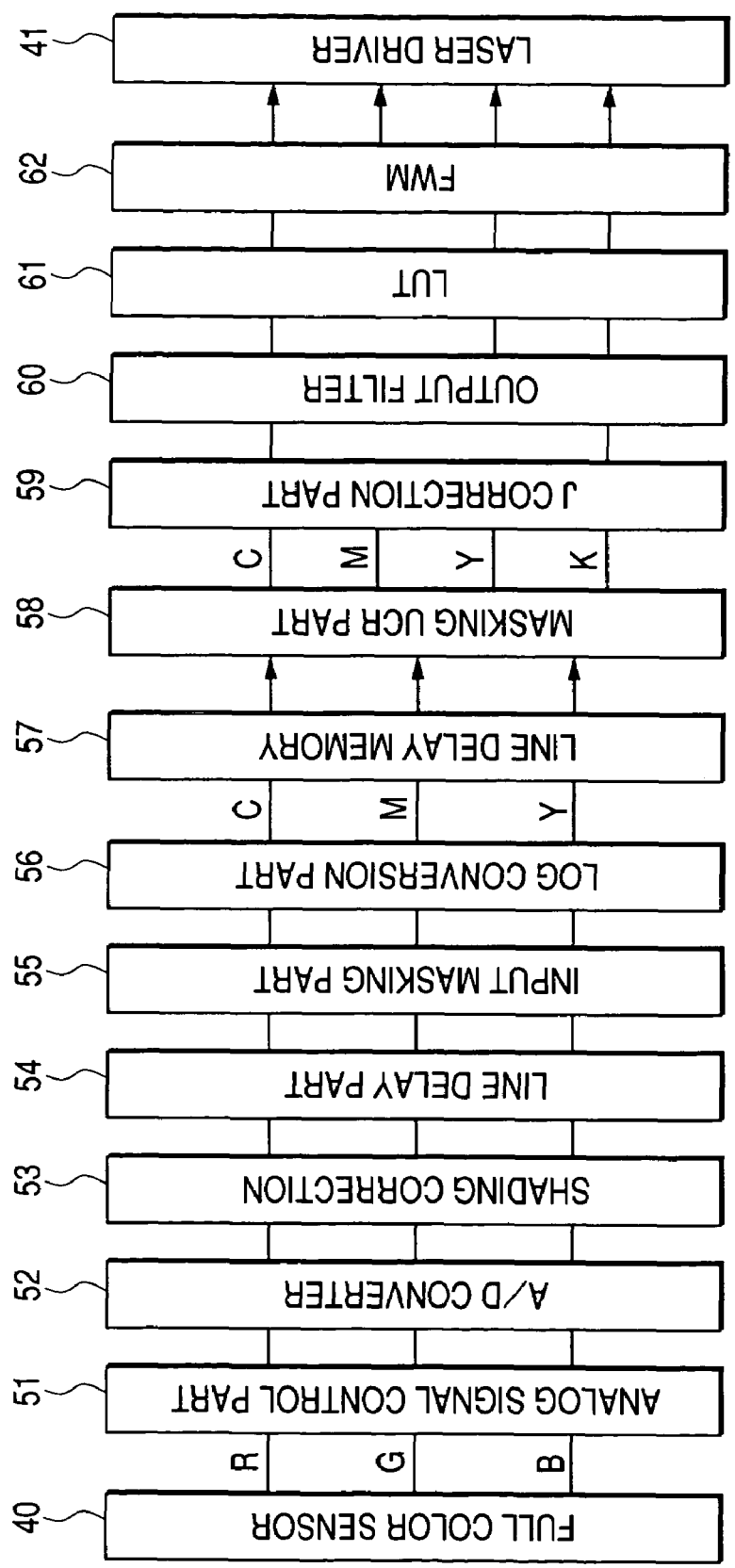
FIG. 7 is a block diagram showing an image processing.

FIG. 7 shows a block diagram of image processing. Referring to FIG. 7, an image signal outputted from a full-color sensor 21c is supplied to an analog signal control part 51 for gain and offset regulations, then converted in an A/D converter 52 into color components, for example RGB digital signals of 8 bits (levels 0-255; 256 gradation levels), and is subjected, in a shading correction part 53, to a known shading correction for optimizing the gain of each CCD sensor cell, utilizing a signal obtained by reading a reference white board (not shown), in order to eliminate the sensitivity fluctuation within a linear array of the CCD sensor cells.

A line delay part 54 corrects a spatial aberration included in the image signal outputted from the shading correction part 53. Such spatial aberration is generated by a fact that the line sensors constituting the full-color sensor 21c are arranged with a mutually predetermined distance in the sub scanning direction. More specifically, R (red) and G (green) color component signals are line delayed in the sub scanning direction with respect to B (blue) color component signal, whereby the three color component signals are synchronized in phase.

An input masking part 55 transforms the color space of the image signal outputted from the line delay part 54, by a matrix calculation shown in an equation (3) in FIG. 8, into a standard NTSC color space. In this manner, the color space of each color component signal from the full-color sensor 40, determined by the spectral characteristics of a filter for each color component, is transformed into the standard NTSC color space.

A LOG conversion part 56, constituted for example of a look-up table (LUT) stored in a ROM or the like, converts the RGB lightness signals from the input masking part 55 into CMY density signals. A line delay memory 57 delays the image signal from the LOG conversion part 56 during a period (line delay period) in which a black character discrimination part (not shown) generates control signals UCR, FILTER, SEN etc. from the output of the input masking part 55.

A masking-UCR part 58 extracts a black component signal K from the image signal outputted from the line delay memory 57, also applies, on the YMCK signals, a matrix calculation for correction of a color turbidity in color recording materials used in the printer portion, and outputs color component image signals for example of 8 bits, in the order of M, C, Y and K for each reading operation of the reader portion. Matrix coefficients used in the matrix calculation are set by a CPU (not shown).

Figure 11:
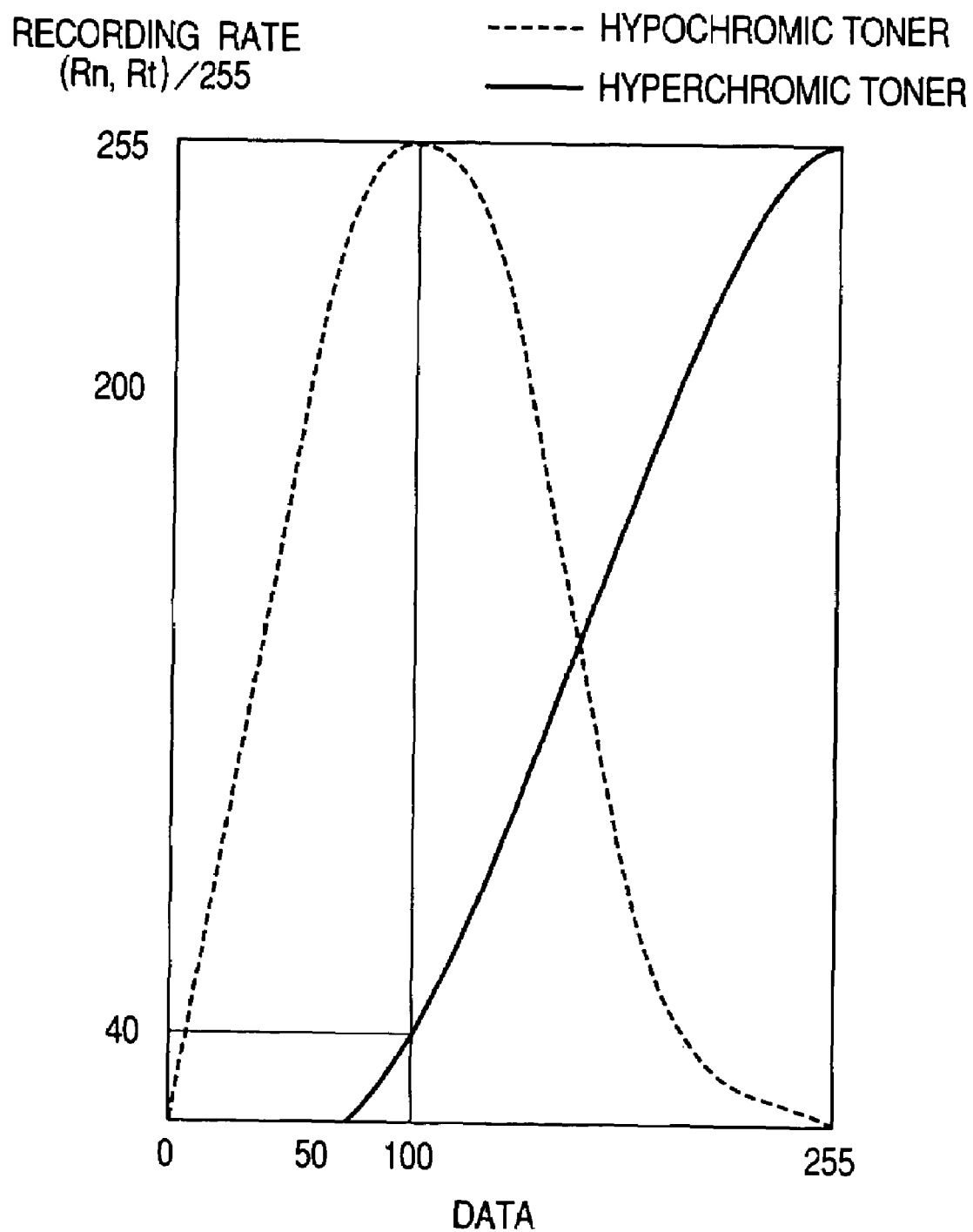
FIG. 11 is a chart showing relationship between recording rates with hypochromic and hyperchromic toners in the embodiment of the invention and gradation data.

Then, there is executed a process, based on 8-bit color component image signals Data of cyan and magenta components, for determining record rates Rn, Rt of hyperchromic dot and hypochromic dot by referring to FIG. 11. For example, for input gradation data Data of 100/255, there are determined a record rate Rt of 255/255 for the hypochromic dot and a record rate Rn of 40/255 for the hyperchromic dot. The record rate is indicated by an absolute value taking 255 as 100%.

A γ correction part 59 applies a density correction on the image signal outputted from the masking-UCR part 58, in order to match the image signal with the ideal gradation characteristics of the printer portion. An output filter (spatial filter process part) 60 applies an edge enhancement or a smoothing process on the image signal from the γ correction part 59, according to a control signal from the CPU.

An LUT 61, for matching the density of the output image with that of the original image, is constituted for example of a RAM and includes a conversion table set by the CPU. A pulse width modulator (PWM) 62 outputs a pulse signal of a pulse width corresponding to the level of the input image signal, and such pulse signal is supplied to a laser driver 41 for driving a semiconductor laser (laser light source).

The present image forming apparatus is equipped with a pattern generator (not shown) in which a gradation pattern is registered whereby a direct signal transfer to the pulse width modulator 62 is made possible.

An exposure apparatus 3 applies a laser scan exposure L to the surface of a photosensitive member 1 based on the image signal entered from the image reading unit 21, thereby forming an electrostatic latent image.

Figure 9:
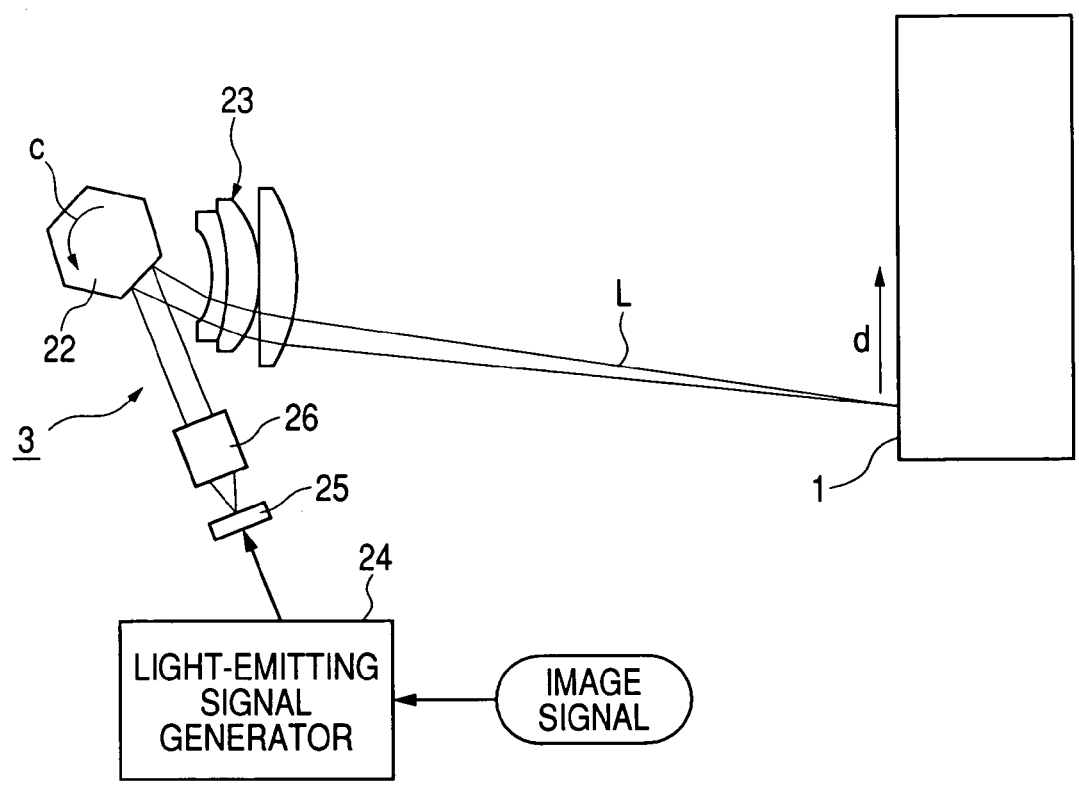
FIG. 9 is a view showing a laser exposure optical system.

FIG. 9 schematically shows the configuration of the exposure apparatus 3. For the laser scan exposure L of the surface of the photosensitive member 1 by the exposure apparatus 3, a solid laser element 25 is turned on/off at a predetermined timing by a light emission signal generator 24, based on the image signal entered from the image reading unit 21. Then the laser beam, emitted from the solid laser element 25 and constituting an optical signal, is converted by a collimating lens system 26 into a substantially parallel light beam, which is then put into a scanning motion, by a rotary polygon mirror 22 rotated at a high speed in a direction c, along a longitudinal direction indicated by an arrow d of the photosensitive member 1 and is focused as a laser spot on the surface thereof through an fθ lens group 23 and reflecting mirrors (cf. FIG. 1). Such laser scanning forms an exposure distribution on the surface of the photosensitive member 1 corresponding to a scan line, and an exposure distribution corresponding to the image signal can be obtained on the surface of the photosensitive member 1 by a scrolling of a predetermined amount of the surface of the photosensitive member 1 in the vertical direction for each scan.

Thus, by scanning the uniformly charged surface (charged at −700 V in the present embodiment) of the photosensitive member 1 with the light of the solid laser element 25, turned on/off corresponding to the image signal, and through the rotary polygon mirror 22 rotated at a high speed, an electrostatic latent image of each color is formed on the surface of the photosensitive member 1 corresponding to the pattern of scan exposure.

Figure 10:
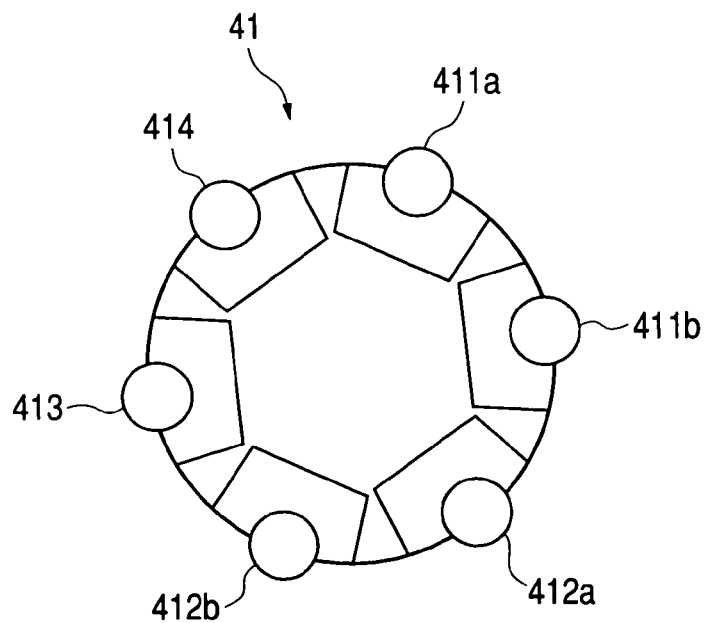
FIG. 10 is a view showing schematic configuration of a developing apparatus.

A developing apparatus 10 is provided, as shown in FIG. 10, with developing devices 411a, 411b, 412a, 412b, 413 and 414 into which respectively introduced are a developer containing a cyan toner a, a developer containing a cyan toner b, developers respectively containing magenta toners a and b, a developer containing a yellow toner and a developer containing a black toner, and develops the electrostatic latent image formed on the photosensitive member 1 serving as the electrostatic latent image bearing member by a magnetic brush development method, whereby a toner image of each color is formed on the photosensitive member 1. For such developing devices, a two-component developing device as shown in FIG. 6 is a preferable example.

Figure 6:
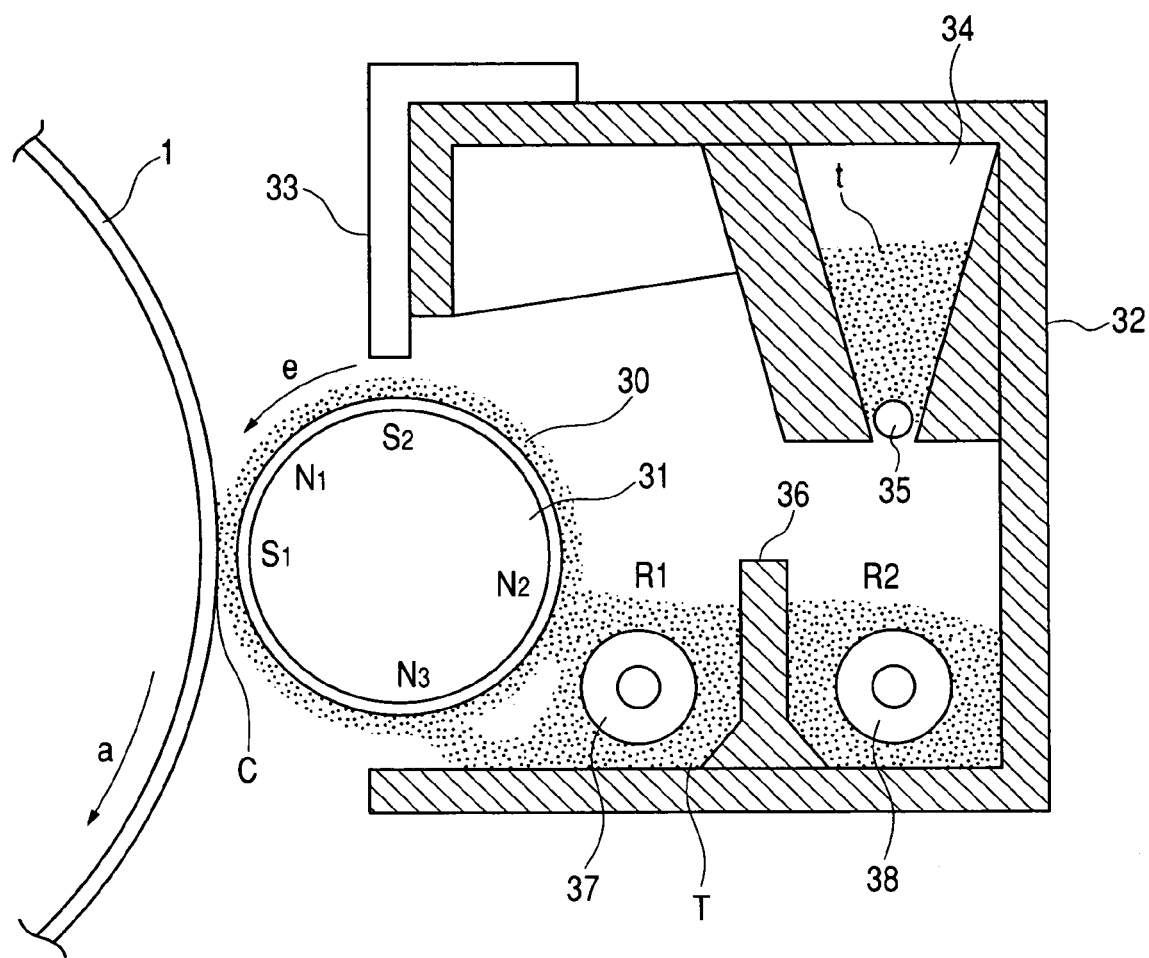
FIG. 6 is a longitudinal cross-sectional view showing configuration of a two-component developing device.

As shown in FIG. 6, a two-component developing device is provided with a developing sleeve 30 rotated in a direction e, in which a magnet roller 31 is provided in fixed manner. A developing container 32 is provided with a regulating blade 33 for forming a thin layer of a developer T on the surface of the developing sleeve 30.

The interior of the developer container 32 is divided by a partition 36 into a developing chamber (first chamber) R1 and an agitating chamber (second chamber) R2, and a toner hopper 34 is positioned above the agitating chamber R2. In the developing chamber R1 and the agitating chamber R2, carrying screws 37, 38 are respectively provided. The toner hopper 34 has a supply aperture 35 through which the toner t is dropped, at the toner replenishment, into the agitating chamber R2.

On the other hand, the developing chamber R1 and the agitating chamber R2 contain a developer T formed by a mixture of the aforementioned toner particles and magnetic carrier particles.

The developer T in the developing chamber R1 is carried by the rotation of the carrying screw 37 along the longitudinal direction of the developing sleeve 30. Also the developer T in the agitating chamber R2 is carried by the rotation of the carrying screw 38 along the longitudinal direction of the developing sleeve 30. The developer carrying direction by the carrying screw 38 is opposite to that by the carrying screw 37.

The partition 36 has apertures (not shown) at a front side and a rear side in the perpendicular direction to the plane of drawing, and the developer T carried by the carrying screw 37 is transferred through one of such apertures to the carrying screw 38, while the developer T carried by the carrying screw 38 is transferred through the other of such apertures to the carrying screw 37. The toner is charged, by a friction with the magnetic particles, in a polarity for developing the latent image.

The developing sleeve 30, constituted of a non-magnetic material such as aluminum or non-magnetic stainless steel, is provided in an aperture in a position of the developer container 32 close to the photosensitive member 1, and is rotated in a direction e (counterclockwise) to support and carry the developer T formed by the mixture of toner and carrier particles to a developing portion C. A magnetic brush formed by the developer T carried on the developing sleeve 30 is brought into contact, at the developing portion C, with the photosensitive member rotated in a direction a (clockwise), whereby the electrostatic latent image is developed in this developing portion C.

To the developing sleeve 30, a power supply (not shown) applies a vibrating bias voltage, formed by superposing a DC voltage with an AC voltage. A dark potential (potential of non-exposed area) and a light potential (potential of exposed area) of the latent image are situated between the maximum and minimum values of such vibrating bias voltage. Thus an AC electric field with alternating directions is formed in the developing portion C. In such AC electric field, the toner and the carrier vibrate vigorously, and the toner overcomes the electrostatic restraint by the developing sleeve 30 and the carrier and is deposited corresponding to the latent image, namely in the light area on the surface of the photosensitive member 1.

A difference between the maximum and minimum values (peak-to-peak voltage) of the vibrating bias voltage is preferably 1 to 5 kV, and a rectangular wave of 2 kV was employed in the present embodiment. Also a frequency is preferably 1 to 10 kHz, and 2 kHz was used in the present embodiment. The wave shape of the vibrating bias voltage is not limited to a rectangular wave, but can also be a sinusoidal wave, a triangular wave etc.

The aforementioned DC voltage component has a value between the dark potential and the light potential of the electrostatic latent image, but is preferably closer to the dark potential than to the absolute minimum light potential, in order to prevent adhesion of fogging toner in the dark potential area. In the present embodiment, a light potential of −200 V and a DC component of the developing bias of −500 V were employed for a dark potential of −700 V. Also a minimum gap between the developing sleeve 30 and the photosensitive member 1 (such minimum gap being positioned in the developing portion C) is preferably from 0.2 to 1 mm, and was selected as 0.5 mm in the present embodiment.

Also an amount of the developer T, regulated by the regulating blade 33 and carried to the developing portion C, is preferably such that the magnetic brush of the developer T, formed by a magnetic field induced in the developing portion C by a developing magnetic pole S1 of the magnet roller 31, has a height of 1.2 to 3 times of the minimum gap between the developing sleeve 30 and the photosensitive member 1, on the surface of the developing sleeve 30 in a state without the photosensitive member 1. It was selected as 700 μm in the present embodiment.

The developing magnetic pole S1 of the magnet roller 31 is provided in a position opposed to the developing portion C, and the magnetic brush of the developer T is formed by the developing magnetic field induced in the developing portion C by such developing magnetic pole S1 and is brought into contact with the photosensitive member 1, thereby developing the dot-distributed electrostatic latent image. In such operation, not only the toner sticking to the magnetic brush of the magnetic carrier but also the toner sticking to the sleeve surface are transferred to an exposed area of the electrostatic latent image thereby achieving development thereof.

An intensity of the developing magnetic field induced by the developing magnetic pole S1 on the surface of the developing sleeve 30 (a magnetic flux density in a direction perpendicular to the surface of the magnetic sleeve 30) preferably has a peak value within a range of $5 \times 10^{-2}$ to $2 \times 10^{-1}$ (T). The magnet roller 31 has poles N1, N2, N3 and S2 in addition to the developing magnetic pole S1.

Now there will be given an explanation on a development step of rendering visible the electrostatic latent image on the surface of the photosensitive member 1 by the two-component magnetic brush method with the developing apparatus 4, and a circulation system for the developer T.

Along with the rotation of the developing sleeve 30, the developer T scooped up by the pole N2 is carried through the pole S2 to the pole N1, and is subjected in the course to a thickness regulation by the regulating blade 33 to form a thin layer of the developer. Then the developer T, formed in a brush in the magnetic field of the developing magnetic pole S1 develops the electrostatic latent image on the photosensitive member 1. Thereafter, by a repulsive magnetic field between the poles N2 and N3, the developer T on the developing sleeve 30 drops into the developing chamber R1. The developer T having dropped into the developing chamber R1 is agitated and carried by the carrying screw 37.

In the present invention, the intermediate transfer member and the transfer means can be constituted of ordinary materials.

A transfer member 5 is constituted of a transfer sheet 5c, having for example a polyethylene terephthalate resin film on the surface and maintained under tension so as to contacted with or separated from the photosensitive member 1. The transfer member 5 is rotated in a direction as indicated by an arrow (clockwise). Inside the transfer member 5, a transfer charger 5a, a separating charger 5b etc. are provided.

In the following, an image forming operation of the above-explained image forming apparatus will be explained.

The photosensitive member 1 is rotated about a central shaft with a predetermined peripheral speed (process speed) in a direction indicated by an arrow a (counterclockwise direction), and is subjected, in the source such rotation by the primary charger 2, to a uniform charging step which is of a negative polarity in the present embodiment.

Then thus uniformly charged surface of the photosensitive member 1 is subjected to a scan exposure L with the laser beam, which is emitted from the exposure apparatus (laser scanning apparatus) 3 and which is modulated according to the image signal outputted from the image reading portion B to the printer portion A, whereby, on the photosensitive member 1, electrostatic latent images of respective colors corresponding to the image information of the original G photoelectrically read by the image reading portion B are formed in succession. The electrostatic latent images formed on the photosensitive member 1 are subjected to a reversal development by the aforementioned two-component magnetic brush method in the developing apparatus 4, and at first the developing device 411a is used to obtain a visible toner image of a first color.

On the other hand, in synchronization with the toner image formation on the photosensitive member 1, a transfer material P such as paper, contained in a sheet cassette 10 is advanced one by one by a sheet feed roller 11 or 12, then supplied to the transfer member 5 at predetermined timing by registration rollers 13, and is electrostatically attracted to the transfer member 5 by the function of an attraction roller 14. The transfer material P electrostatically attracted on the transfer member 5 is moved to a position opposed to the photosensitive member 1 by the rotation of the transfer member 5 in a direction indicated by an arrow (clockwise), and the transfer material P is given, on the back side thereof, a charge of a polarity opposite to that of the toner by the transfer charger 5a, whereby the toner image on the photosensitive member 1 is transferred onto the top side.

After the transfer, transfer residual toner, remaining on the photosensitive member 1, is removed by a cleaning apparatus 6 and is used for a next toner image formation.

Thereafter the electrostatic latent image on the photosensitive member 1 is developed in a similar manner, so that an cyan toner a image, a cyan toner b image, a magenta toner a image, a magenta toner b image, a yellow toner image and a black toner image, formed on the photosensitive member 1, are transferred by the transfer charger 5a onto the transfer material P on the transfer member 5 in superposition, thereby forming a full-color image.

Then the transfer material P is separated by a separating charger 5b from the transfer member 5 and is conveyed by a conveyor belt 8 to a fixing apparatus 9. The transfer material P enters the fixing apparatus 9 with a speed of about 200 mm/sec, then is heated at about 160° C. and pressed under a pressure of 70 kg between a fixing roller 9a (silicone rubber of a thickness of 2.4 mm, diameter: 60 mm, hardness: 79 (ASK-C load 1 kg)) and a pressure roller 9b (silicone rubber of a thickness of 1.8 mm, diameter: 60 mm, hardness: 81 (ASK-C load 1 kg)) to fix the full-color image on the surface, and is discharged by discharge rollers 15 onto a discharge tray 16.

The surface of the photosensitive member 1 is subjected to a removal of the transfer residual toner by the cleaning apparatus 6, and further subjected to a charge elimination by a pre-exposure lamp 7, thereby being prepared for a next image formation.

In order to confirm the effect of the present invention, a density gradated image of magenta color was printed with changes in the latent image writing resolution for hypochromic development and the latent image writing resolution for hyperchromic development, and the visibility of the aforementioned screen and the improvement in the gradation in the high density area were investigated. Obtained results are shown in Table 1.

TABLE 1

| | Hyperchromic toner resolution | Hypochromic toner resolution | Highlight screen visibility | High density area gradation |
|---|---|---|---|---|
| Ex. 1 | 200 | 400 | S | S |
| Comp. Ex. 1 | 200 | 200 | P | S |
| Comp. Ex. 2 | 400 | 200 | P | P |
| Comp. Ex. 3 | 400 | 400 | S | P |

P poor
S satisfactory

These results indicate that the configuration of the present invention has a significant improving effect on the visibility of the screen and the gradation of the high density area.

According to the above-described embodiment, an image formation with hyperchromic-hypochromic toners of substantially same hues is executed utilizing a writing resolution for the hypochromic toner larger than that for the hyperchromic toner, thereby rendering screen lines less visible in a highlight area and stabilizing the density and the color in a high density area, so that a photograph-like image, for which the hyperchromic-hypochromic toners are often used, can be obtained in a visually preferable manner.

In summary, the electrophotographic recording apparatus of the above-described embodiment includes a photoconductive image bearing member; charging means which uniformly charges the image bearing member; exposure means which effects an imagewise exposure on a surface of the image bearing member after charging thereby forming an electrostatic latent image; development means which adheres a toner onto the electrostatic latent image thereby forming a toner image; and transfer means which transfers the formed toner image onto a transfer material; wherein an image is formed with plural toners including a hyperchromic toner and a hypochromic toner of substantially same hues, and a writing resolution for an image for the hypochromic toner is made larger than a writing resolution for an image for the hyperchromic toner.

For each of cyan and magenta colors, two toners of different densities are employed.

Also there is provided means which separated the image density data into image data for hyperchromic toner and those for hypochromic toner, and the exposure means is so constructed as to form the electrostatic latent image according to thus separated image data. Also the development process for the hyperchromic toner and the development process for the hypochromic toner were so constructed as not to be multiplexed.

The present invention has been explained by certain preferred embodiments thereof, but the present invention is not limited to such embodiments and is naturally subject to various modifications and applications within the scope and spirit of the appended claims.

What is claimed is:

1. An electrophotographic image recording apparatus for forming an image, the apparatus comprising:
   a photoconductive image bearing member;
   charging means which uniformly charges said photoconductive image bearing member;
   exposure means that exposes a surface of said photoconductive image bearing member after said charging means charges said photoconductive image bearing member, to form an electrostatic latent image on the surface of said photoconductive image bearing member;
   development means which adheres a toner onto said electrostatic latent image to form a toner image with a hyperchromic toner or a hypochromic toner, the hyperchromic toner and hypochromic toner having substantially the same hue; and
   transfer means which transfers the toner image formed by development means onto a transfer material;
   wherein said exposure means forms the electrostatic latent image on the surface of said image bearing member in a writing resolution for an image formed with the hypochromic toner which is higher than a writing resolution for an image formed with the hyperchromic toner.

2. An apparatus according to claim 1, wherein said plural toners include a cyan color toner and a magenta color toner, and each of the cyan color toner and the magenta color toner includes two types of toners of respectively different densities.

3. An apparatus according to claim 1, further comprising:
   means which separates image density data into image data for a hyperchromic toner and image data for a hypochromic toner;
   wherein said exposure means forms an electrostatic latent image according to said separated image data.

4. An apparatus according to claim 1, wherein a developing process with the hypochromic toner and a developing process with the hyperchromic toner are not multiplexed.

5. An electrophotographic image recording apparatus for forming an image, the apparatus comprising:

a photoconductive image bearing member;

a charging device adapted for uniformly charging said photoconductive image bearing member;

an exposure device that exposes a surface of said photoconductive image bearing member after said charging device charges said photoconductive image bearing member, to form an electrostatic latent image;

a development device adapted for adhering a toner onto the electrostatic latent image to form a toner image with a hyperchromic toner or a hypochromic toner, the hyperchromic toner and hypochromic toner having substantially the same hue; and a transfer device adapted for transferring the formed toner image onto a transfer material;

wherein said exposure means forms the electrostatic latent image on the surface of said image bearing member in a writing resolution for an image formed with the hypochromic toner which is higher than a writing resolution for an image formed with the hyperchromic toner.

6. An electrophotographic image recording method for forming an image said method comprising:

uniformly charging a photoconductive image bearing member;

exposing a surface of said photoconductive image bearing member after said photoconductive image bearing member is uniformly charged, to form an electrostatic latent image;

adhering a toner onto said electrostatic latent image to form a toner image with a hyperchromic toner or a hypochromic toner, the hyperchromic toner and hypochromic toner having substantially the same hue;

wherein said exposing a surface of the photoconductive image bearing member forms an electrostatic latent image in a writing resolution for an image for the hypochromic toner that is higher than a writing resolution for an image for the hyperchromic toner.

* * * * *

UNITED STATES PATENT AND TRADEMARK OFFICE
CERTIFICATE OF CORRECTION

PATENT NO.         : 7,315,712 B2                                  Page 1 of 1
APPLICATION NO. : 10/878049
DATED                 : January 1, 2008
INVENTOR(S)       : Nobuyuki Ito It is certified that error appears in the above-identified patent and that said Letters Patent is hereby corrected as shown below:

ON THE TITLE PAGE:
At Item (54), in the TITLE, Line 3, "THEREFORE" should read --THEREFOR--.

COLUMN 1:
Line 3, "THEREFORE" should read --THEREFOR--.

COLUMN 3:
Line 9, "a-range" should read --a range--.

COLUMN 4:
Line 17, "recording." should read --recording--.

COLUMN 10:
Line 25, "to" should read --to be--.

COLUMN 11:
Line 7, "an" should read --a--.

COLUMN 14:
Line 2, "image" should read --image,--.

Signed and Sealed this

Fifth Day of August, 2008

JON W. DUDAS
*Director of the United States Patent and Trademark Office*